United States Patent [19]

Shimizu et al.

[11] Patent Number: 5,352,748
[45] Date of Patent: Oct. 4, 1994

[54] POLYMER SCALE PREVENTIVE AGENT, POLYMERIZATION VESSEL WHEREIN POLYMER SCALE IS PREVENTED FROM DEPOSITING, AND PROCESS OF PRODUCING POLYMER USING THE SAME

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 20,978

[22] Filed: Feb. 22, 1993

[30] Foreign Application Priority Data

Feb. 20, 1992 [JP] Japan .................. 4-070299

[51] Int. Cl.⁵ .................. C08F 2/04; C08F 2/12
[52] U.S. Cl. .................. 526/62; 526/208; 422/131
[58] Field of Search .................. 526/62, 208; 422/131

[56] References Cited

U.S. PATENT DOCUMENTS 4,105,839 8/1978 Koyanagi et al. .................. 526/62

FOREIGN PATENT DOCUMENTS 3019389 12/1980 Fed. Rep. of Germany .
2320952 3/1977 France .

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A polymer scale preventive agent used for polymerizing a monomer having an ethylenically unsaturated double bond, comprising an alkaline solution containing (A) an anthraquinone dye and (B) a reducing agent. Where the monomer is polymerized in a polymerization vessel having, on the inner wall surface, a coating film formed by applying and drying said preventive agent, polymer scale can effectively be prevented from being deposited not only on the liquid phase part in the polymerization vessel but also near the interface between the gas phase part and the liquid phase part, so that the thus obtained polymer can provide a molded item having few fish eyes, when the polymer is molded into a sheet or the like.

7 Claims, No Drawings

POLYMER SCALE PREVENTIVE AGENT, POLYMERIZATION VESSEL WHEREIN POLYMER SCALE IS PREVENTED FROM DEPOSITING, AND PROCESS OF PRODUCING POLYMER USING THE SAME

BACKGROUND OF THE INVENTION

1. Field of the Invention

The present invention relates to a polymer scale preventive agent for use in polymerization of a monomer having an ethylenically unsaturated double bond, a polymerization vessel wherein polymer scale is effectively prevented from being deposited, and a process of producing a polymer using the same.

2. Description of the Prior Art

Hitherto, as processes of polymerizing a monomer having an ethylenically unsaturated double bond, for example, the suspension polymerization, the emulsion polymerization, the solution polymerization, the gas phase polymerization, and the bulk polymerization are known. In any of these processes, polymer scale is apt to be deposited at parts where the monomer comes in contact, for example, on the inner wall surface of a polymerization vessel and an agitator.

If polymer scale is deposited, for example, the yield of the polymer drops, the capacity of cooling the polymerization vessel decreases, and further the poller scale is peeled off and is mixed with the polymer, thereby disadvantageously degrading the item that is obtained by molding the polymer. In addition, to remove the deposited polymer scale, not only too much labor and time are required but also since the polymer scale contains unreacted monomer, there is a danger that the human body will be injured by that monomer, which has become quite a serious problem in recent years.

Concerning prevention of deposition of polymer scale on the polymerization vessel inner wall surface and the like as mentioned above, conventionally, a method wherein a polymer scale preventive agent comprising a polar organic compound such as an amine compound, a quinone compound, and an aldehyde compound is applied and a method wherein such a polar organic compound is added to an aqueous medium are known (Japanese Patent Publication (kokoku) No. 45-30343 (1970)), which are used, for example, in some cases of suspension polymerization of vinyl chloride.

However, although these methods exhibit an effect of preventing polymer scale from being deposited until the polymerization is repeated to the extent of about 5 to 6 batches, when the polymerization is repeated further, the preventive effect declines (i.e., the preventive effect is poor in durability), which is a disadvantage. In this regard, the influence is particularly serious where an water-soluble catalyst is used, and these methods are not satisfactory from an industrial point of view.

In order to overcome this disadvantage, Japanese Pre-examination Patent Publication (kokai) No.53-13689 (1978) suggests the use of a condensation product of an aromatic amine compound as a polymer scale preventive agent. If a coating film containing this condensation product of an aromatic amine compound is formed on the part where a monomer comes in contact such as the polymerization vessel inner wall surface or the like, polymer scale is not deposited on the liquid phase part in the polymerization vessel even if the polymerization is repeated to the extent of 100 to 200 batches. Further, even in the case where a water-soluble catalyst is used, similarly polymer scale is prevented from being deposited on the liquid phase part.

However, there is a defect that polymer scale is deposited near the interface between the gas phase part and the liquid phase part positioned at the upper part of the polymerization vessel.

Once polymer scale is deposited near the interface between the gas phase part and the liquid phase part, along with the repetition of the polymerization the deposited polymer scale gradually grows, ultimately leading to peeling-off of the polymer scale, which mixes into the polymer in some cases. If the polymer scale thus mixes into the polymer, where the polymer is worked into a molded item such as a sheet, many fish eyes occur in the obtained molded item, thereby degrading the molded item conspicuously.

In forming a coating film of the condensation product of an aromatic amine compound mentioned above, since the condensation product is used in the form of a coating liquid wherein the condensation product is dissolved in an organic solvent or a mixed solvent made up of an organic solvent as a major component and water (generally the content of the organic solvent is 60 wt. % or more), there is such a risk that the organic solvent will catch fire and explode, and further there is a safety problem including toxicity and the like in handling.

SUMMARY OF THE INVENTION

Therefore, an object of the present invention is to provide a polymer scale preventive agent which when used in polymerizing a monomer having an ethylenically unsaturated double bond can effectively prevent polymer scale from being deposited not only on the liquid phase part in a polymerization vessel but also even near the interface between the liquid phase part and the gas phase part in the polymerization vessel, can produce a polymer which can be molded into a sheet or the like with quite few fish eyes, and has less risk of catching fire and explosion and is free from a safety problem including toxicity and the like in handling when a coating film is formed therefrom, to provide a polymerization vessel using said preventive agent, and to provide a process of producing a polymer.

The present invention provides a polymer scale preventive agent used for polymerizing a monomer having an ethylenically unsaturated double bond, comprising an alkaline solution containing (A) an anthraquinone dye and
(B) a reducing agent.

The present invention also provides a polymerization vessel for polymerizing a monomer having an ethylenically unsaturated double bond, which polymerization vessel has, on the inner wall surface, a coating film which is formed by applying and drying an alkaline solution containing (A) an anthraquinone dye and
(B) a reducing agent.

The present invention further provides a process of producing a polymer by polymerizing a monomer having an ethylenically unsaturated double bond in a polymerization vessel, comprising the step of carrying out the polymerization in a polymerization vessel having, on the inner wall surface, a coating film which is formed by applying and drying an alkaline solution containing (A) an anthraquinone dye and
(B) a reducing agent, whereby polymer scale is prevented from being deposited.

According to the present invention, polymer scale can be prevented effectively from being deposited not only on the liquid phase part in the polymerization vessel but also near the interface between the gas phase part and the liquid phase part in the polymerization vessel. Therefore, where polymerization is carried out with the present invention applied, the removal operation of polymer scale is not required each time after the polymerization and therefore the productivity can be improved.

Where the polymer obtained by the polymerization with the present invention applied is molded into a sheet or the like, a molded item with quite few fish eyes can be obtained.

Further, since the present polymer scale preventive agent can keep the amount of an organic solvent used to a lower level, there is less risk of catching fire, explosion, or the like, and the present polymer scale preventive agent can be used in the range where there is no safety problem including toxicity in handling.

DETAILED DESCRIPTION OF PREFERRED EMBODIMENTS (A) Anthraquinone Dyes

Examples of the anthraquinone dye include an acylaminoanthraquinone compound such as 1,4-bis(benzoylamino)anthraquinone, C.I. Vat Yellow 26, C.I. Vat Yellow 12, C.I. Vat Yellow 10, C.I. Vat Dye (C.I. 66000), and C.I. Vat Violet 17; an Anthrimide compound such as C.I. Vat Orange 20 and di-α-anthraquinoyl-2,6-dianthraquinone; an indanthrone compound such as indanthrone and C.I. Vat Blue 6;an anthraquinonethiazole compound such as C.I. Vat Yellow 2 and C.I. Vat Blue 30; an anthrapyrazolone compound such as C.I. Vat Red 13; an anthrapyrimidine compound such as C.I. Vat Yellow 29 and C.I. Vat Yellow 31; a dibenzanthrone compound such as violanthrone, isoviolanthrone, C.I. Vat Blue 22, C.I. Vat Blue 19, C.I. Vat Violet 10, C.I. Vat Violet 9, 6,15-dimethoxyisoviolanthrone, and C.I. Vat Green 3; an anzanthrone compound such as anzanthrone, C.I. Vat Orange 19 and C.I. Vat Orange 3; an anthraquinoneacridone compound such as 2,1-anthraquinoneacridone, 1,2-anthraquinoneacridone, C.I. Vat Blue 33; C.I. Vat Red 38, C.I. Vat Violet 13, C.I. Vat Orange 13, C.I. Vat Green 12, and C.I. Vat Brown 55; a pyranthrone compound such as pyranthrone, C.I. Vat Orange 9, and C.I. Vat Orange 2; and an anthraquinonecarbazole compound such as C.I. Vat Yellow 28, C.I. Vat Orange 15, C.I. Vat Brown 3, C.I. Vat Black 27, C.I. Vat Green 3, C.I. Vat Brown 1, C.I. Vat Brown 3, C.I. Vat Brown 44, C.I. Vat Orange 11, C.I. Vat Brown 8, and C.I. Vat Green 8.

Preferable ones out of the above anthraquinone dyes are C.I. Vat Yellow 26, C.I. Vat Orange 11, C.I. Vat Red 13, C.I. Vat Yellow 28, anthraquinonecarbazole, C.I. Vat Blue 22, C.I. Vat Blue 30, C.I. Vat Blue 33, C.I. Vat Brown 1, C.I. Vat Orange 13, and anthraquinoneacridone.

The above anthraquinone dyes can be used singly or as a mixture of two or more.

(B) Reducing Agents

The reducing agent includes, for example, hydrogen and hydrogen iodide, hydrogen bromide, hydrogen sulfide, a hydride such as lithium aluminum hydride, sodium boron hydride, calcium boron hydride, zinc boron hydride, a tetraalkylammonium boron hydride, trichlorosilane, and triethylsilane; a lower oxide and a lower oxyacid such as carbon monoxide, sulfur dioxide, sodium thiosulfate, sodium thiosulfite, sodium sulfite, potassium sulfite, sodium bisulfite, and sodium hydrosulfite; a sulfur compound such as Rongalit, sodium sulfide, sodium polysulfide, and ammonium sulfide; an alkali metal such as sodium and lithium; a metal high in electropositivity such as magnesium, calcium, aluminum, and zinc and their amalgams; a salt of a metal in a lower valence state such as iron(II) sulfate, tin(II) chloride, and titanium(III) trichloride, a phosphorus compound such as phosphorus trichloride, phosphorus triiodide, trimethylphosphine, triphenylphosphine, trimethylphosphite, and hexamethylphosphorus triamide; hydrazine; a diborane and a substituted diborane such as diborane, ethane-1,2diaminoborane, dimethylamineborane, and pyridineborane. Among these, preferable ones are sodium hydrosulfite, Rongalit, sodium thiosulfate, and sodium sulfite. Polymer scale preventive agents comprising an alkaline solution that contains the component (A) and the component (B)

The present polymer scale preventive agent comprises an alkaline solution that contains the component (A) and the component (B) mentioned above. By applying the above polymer scale preventive agent on a polymerization vessel inner wall surface and the like and drying it to form a coating film, polymer scale can be prevented from being deposited on the polymerization vessel inner wall surface and the like.

The present polymer scale preventive agent is prepared, for example, by mixing and dispersing the above anthraquinone dye (A) into an aqueous medium, then adding the reducing agent (B) to the obtained dispersion, and adjusting the pH of the obtained mixture to the alkaline range to obtain a uniform solution.

The present polymer scale preventive agent is alkaline. As a result, the solubility of the anthraquinone dye (A) in the aqueous medium can be improved to provide the polymer scale preventive agent in the form of a uniform solution. Therefore, if the present polymer scale preventive agent is applied on a polymerization vessel inner wall surface or the like, the effect of preventing polymer scale from being deposited is improved. Preferably the pH of the polymer scale preventive agent is 7.5 to 13.5, more preferably 8.0 to 12.0. Examples of the alkaline compound used as a pH adjustor include an alkali metal compound and ammonium compound such as LiOH, KOH, NaOH, $Na_2CO_3$, $Na_2SiO_3$, $Na_2HPO_4$, and $NH_4OH$ as well as an organic amine compound such as ethylenediamine, monoethanolamine, and triethanolamine. In this connection, after making the polymer scale preventive agent into a uniform solution after adjusting the pH, it is also possible that the polymer scale preventive agent is rendered acidic in the range where the polymer scale preventive agent does not become nonuniform, for example, by the formation of a sediment. In this case, as the acid compound used as a pH adjustor, any acid compound can be used without particular restrictions.

The term "an aqueous medium" used in preparing the polymer scale preventive agent refers to water and a mixed solvent made up of an organic solvent miscible with water and water. The organic solvent that will be used in the mixed solvent made up of an organic solvent miscible with water and water is used in such an amount that it will not lead to a risk of catching fire, explosion, and the like and will not cause a safety problem including toxicity in handling, and specifically that organic solvent is used generally in an amount of 50 wt. % or less, preferably 20 wt. % or less. As the organic solvent miscible with water, alcohols such as methanol, ethanol, and propanol; ketches such as acetone and methyl ethyl ketone; and esters such as methyl acetate and ethyl acetate can be used with preference given to alcohols.

Although the concentration of the anthraquinone dyes in the polymer scale preventive agent is not particularly restricted so long as the total coating amount described later can be secured, generally the concentration thereof is 0.001 to 15 wt. %, preferably 0.01 to 1 wt.

Preferably, the amount of the reducing agent to be used is 0.01 to 20 parts by weight, more preferably 0.1 to 5 parts by weight, per part by weight of the anthraquinone dye.

To the present polymer scale preventive agent, a water-soluble polymer compound such as a hydroxyl group-containing polymer compound, a cationic polymer compound, an anionic polymer compound, and an amphoteric polymer compound can optionally be added so long as it does not impair the polymer scale deposition preventive action.

Examples of the hydroxyl group-containing polymer compound include starches and their derivatives such as amylose, amylopectin, dextrins, oxidized starches, acetyl starches, nitro starches, methyl starches, and carboxymethyl starches; hydroxyl group-containing mucilages such as pectic acid, protopectin, pectinic acid, alginic acid, laminarin, fucoidin, agar, and carrageenan; hydroxyl group-containing animal mucoids such as hyaluronic acid, chondroitin sulfuric acid, heparin, keratosulfonic acid, chitin, chitosan, charonin sulfuric acid, and limacoitin sulfuric acid; nucleic acids such as ribonucleic acid and deoxyribonucleic acid; cellulose derivatives such as methyl cellulose, ethyl cellulose, carboxymethyl cellulose, glycol cellulose, benzyl cellulose, cyanoethyl cellulose, methylene ether of cellulose, triphenyl methyl cellulose, formyl cellulose, cellulose acetate, cellulose propionate, cellulose butyrate, cellulose acetate propionate, cellulose sulfonate, cellulose carbamate, nitrocellulose, cellulose phosphate, and cellulose xanthogenate; hemicelluloses such as xylan, mannan, arabogalactan, galactan, and araban; lignins such as an alcohol lignin, dioxane lignin, phenol lignin, hydrotropic lignin, mercaptolignin, thioglycolic acid lignin, lignin sulfonic acid, alkali lignin, thio-alkali lignin, acid lignin, cuproxam lignin, and periodate lignin; phenol/formaldehyde resins; partially saponified polyvinyl alcohols, and completely saponified polyvinyl alcohols.

Examples of the cationic polymer compound include cationic polymer electrolytes that have positively charged nitrogen atoms in the side chains such as polyvinylamines, polyethyleneamines, polyethyleneimines, polyacrylamides, N-vinyl-2-pyrrolidone/acrylamide copolymers, cyclized polymers of dimethyldiamylammonium chloride, cyclized polymers of dimethyldiethylammonium bromide, cyclized polymers of diallyamine hydrochloride, cyclized copolymers of dimethyldiamylammonium chloride and sulfur dioxide, polyvinyl pyridines, polyvinyl pyrrolidones, polyvinyl carbazoles, polyvinyl imidazolines, polydimethylaminoethyl acrylates, polydimethylaminoethyl methacrylates, polydiethylaminoethyl acrylates, and polydiethylaiminoethyl methacrylates.

Examples of the anionic polymer compound include sulfomethylated polyacrylamides; polyacrylic acids; alginic acid, acrylamide/vinylsulfonic acid copolymers, polymethacrylates, and polystylenesulfonic acids, and their alkali metal salts and ammonium salts; and anionic polymer compounds that have carboxyl groups or sulfonic acid groups in the side chains such as carboxymethyl cellulose.

Examples of the amphoteric polymer compound include amphoteric polymer compounds such as glues, gelatins, caseins, and albumins.

To the present polymer scale preventive agent, an inorganic compound can optionally be added so long as it does not impair the polymer scale preventive action. Examples of the inorganic compound that can be added include silicic acids and silicates such as orthosilicic acid, metasilicic acid, mesodisilicic acid, mesotrisilicic acid, mesotetrasilicic acid, sodium metasilicate, sodium orthosilicate, sodium disilicate, sodium tetrasilicate, and water glasses; metal salts such as oxyacid salts, acetates, nitrates, hydroxides, and halides of a metal such as an alkaline earth metal, for example, magnesium, calcium, and barium, a zinc family metal, for example, zinc, an aluminum family metal, for example, aluminum, and a platinum family metal, for example, platinum; and inorganic colloids such as ferric hydroxide colloid, colloidal silica, barium sulfate colloid, and aluminum hydroxide colloid. These inorganic colloids may be prepared by mechanical grinding, irradiation with ultrasonic waves, electrical dispersion, or chemical means.

Formation Of A Coating Film

To form a coating film on a polymerization vessel inner wall surface using the polymer scale preventive agent prepared in the above manner, the polymer scale preventive agent is applied on the polymerization vessel inner wall surface, then is dried sufficiently at a temperature in the range, for example, of room temperature to 100° C., and is optionally washed with water.

Preferably the polymer scale preventive agent is applied not only on a polymerization vessel inner wall surface but also on other parts with which a monomer comes in contact during the polymerization. Such other parts include agitating blades, an agitating shaft, baffles, a condenser, a header, a search coil, bolts, and nuts.

More preferably, it is recommended that the coating film of the polymer scale preventive agent is formed on, in addition to the parts where a monomer comes in contact, parts where polymer scale is likely deposited, for example, the inner surfaces of equipments and pipelines of a recovery system of unreacted monomer. Specific examples are the inner surfaces of a monomer distillation column, a condenser, a monomer storing tank, and valves.

The method of applying the polymer scale preventive agent to the polymerization vessel inner wall surface is not particularly restricted and the application can be carried out, for example, by brushing, by spraying, or by filling the polymerization vessel with the polymer scale preventive agent and then withdrawing the polymer scale preventive agent, and automatic coating methods described, for example, in Japanese Pre-examination Patent Publication (kokai) Nos. 57-61001 (1982) and 55-36288 (1980), Japanese Patent Publication (kohyo) Nos. 56-501116 (1981) and 56-501117 (1981), and Japanese Pre-examination Patent Publication (kokai) No. 59-11303 (1984) can be employed for the application as well.

The method of drying the wet surface formed by the application of the polymer scale preventive agent is not particularly restricted and, for example, the following technique can be adopted: a method wherein after the application of the polymer scale preventive agent, warm air having a suitable temperature is blown against the coated surface, or a method wherein the polymerization vessel inner wall surface and other surfaces where the polymer scale preventive agent is to be applied are previously heated, for example, to 30° to 80° C. and the polymer scale preventive agent is directly applied to the heated surfaces. After the coated surfaces are dried, the coated surfaces are optionally washed with water.

The thus obtained coating film is generally in an amount of 0.001 to 19 g/m², particularly preferably 0.05 to 2 g/m₂, in terms of the total coating weight after the drying.

It is advisable that the above coating operation is carried out each time after the polymerization is carried out in 1 to 10 and several batches. Since the formed coating film is high in durability and the polymer scale preventive action lasts, it is not necessarily required to carry out the coating operation each time after the polymerization of 1 batch. As a result, the productivity of the polymer that will be obtained is improved.

Polymerization

After the coating is carried out in the above manner form a coating film on the polymerization vessel inner wall and preferably on the other parts where a monomer comes in contact during the polymerization, the polymerization is carried out in the polymerization vessel in usual manner. That is, a monomer having an ethylenically unsaturated double bond, a polymerization initiator (catalyst), and optionally a polymerization medium such as water, a suspending agent, a solid dispersant, a dispersant such as a nonionic emulsifier and an anionic emulsifier, etc. are charged, and then the polymerization is carried out in usual manner.

The monomer having an ethylenically unsaturated double bond which will be polymerized by applying the present process includes, for example, a vinyl halide such as vinyl chloride; a vinyl ester such as vinyl acetate and vinyl propionate; acrylic acid and methacrylic acid and their esters and salts; maleic acid and fumaric acid and their esters and anhydrides; a diene monomer such as butadine, chloroprene, and isoprene; styrene; acrylonitrile; a vinylidene halide; and a vinyl ether, which may be used singly or as a mixture of two or more.

The type of polymerization to which the present process is applied is not particularly restricted and any polymerization type of suspension polymerization, emulsion polymerization, solution polymerization, bulk polymerization, and gas phase polymerization is effective, and particularly the present process is more suitable for polymerization in an aqueous medium such as suspension polmerization and emulsion polymerization.

Now, a general polymerization process will be described specifically with reference to examples of suspension polymerization and emulsion polymerization.

First, water and a dispersing agent are charged into a polymerization vessel and then a polymerization initiator is charged. Next, after the inside of the polymerization vessel is evacuated to bring the pressure therein to 0.1 to 760 mmHg, a monomer is charged (at that time, the pressure in the polymerization vessel will become generally 0.5 to 30 kgf/cm².G), and the polymerization is carried out a reaction temperature of 30° to 150° C. During the polymerization, if desired, one or two of water, a dispersing agent, and a polymerization initiator are added. The reaction temperature at the time of polymerization will vary depending on the type of monomer to be polymerized, for example, in the case of polymerization of vinyl chloride, the polymerization is carried out at 30° to 80° C., and in the case of styrene, the polymerization is carried out at 50° to 150° C. It is judged that the polymerization has been completed when the internal pressure of the polymerization vessel has lowered 0 to 7 kgf/cm². G or the difference of the inlet temperature and the outlet temperature of the cooling water flowing into and out of the jacket provided around the polymerization vessel has become about zero (i.e., when the heat due to the polymerization reaction has not been generated). The amounts of the water, the dispersing agent, and the polymerization initiator to be charged at the time of the polymerization are Generally 20 to 500 parts by weight, 0.01 to 30 parts by weight, and 0.01 to 5 parts by weight, respectively, per 100 parts by weight of the monomer.

In the case of solution polymerization, in place of water as a polymerization medium, an organic solvent such as toluene, xylene, and pyridine is used. A dispersing agent is optionally used. Other polymerization conditions are generally the same as those of suspension polymerization and emulsion polymerization.

Further, in the case of bulk polymerization, after the inside of a polymerization vessel is evacuated to bring the pressure to about 0.01 to 760 mmHg, a monomer and a polymerization initiator are charged into the polymerization vessel, and the polymerization is carried out at a reaction temperature of −10° to 250° C. For example, in the case of vinyl chloride, the polymerization is carried out at 30° to 80° C., and in the case of styrene, the polymerization is carried out at 50° to 150° C.

Where polymerization is carried out by applying the present method of preventing polymer scale from being deposited, polymer scale can be prevented from being deposited regardless of the material of the polymerization vessel inner wall surface and the like, and, for example, polymer scale can be prevented from being deposited even in the case where the polymerization is carried out in a polymerization vessel of a stainless steel or other steel or in a Glass-lined polymerization vessel or the like.

Materials to be added to the polymerization system can be used without any particular restrictions. That is, the present process can effectively prevent polymer scale from being deposited even in a polymerization system where there are, for example, a polymerization initiator such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-methane hydroperoxide; a suspending agent of a natural or synthetic polymer compound such as partially saponified polyvinyl alcohols, polyacrylic acids, copolymers of vinyl acetate and maleic anhydride, cellulose derivatives, e.g., hydroxypropyl methyl cellulose and gelatins; a solid dispersing agent such as calcium phosphate and hydroxy apatite; a nonionic emulsifier such as sorbitan monolaurate, sorbitan trioleate, and polyoxyethylene alkyl ethers; an anionic emulsifier such as sodium lauryl sulfate, sodium alkylbenzenesulfonates, e.g., sodium dodecylbenzenesulfonate, and sodium dioctylsulfosuccinate; a filler such as calcium carbonate and titanium oxide; a stabilizer such as tribasic lead sulfate, calcium stearate, dibutyl tin dilaurate, and dioctyl tin mercaptide; a lubricant such as rice wax, stearic acid, and cetyl alcohol; a plasticizer such as DOP and DBP; a chain transfer agent such as mercaptans, e.g., t-dodecyl mercaptan and trichloroethylene; and a pH adjustor.

In addition to the use of the present polymer scale preventive agent for forming a coating film on a polymerization vessel inner wall surface and the like, the polymer scale preventive agent may also be added to a polymerization system directly, whereby the polymer scale preventive effect can be improved. In this case, the amount of the polymer scale preventive agent to be added is suitably about 10 to 1,000 ppm based on the total amount of the monomers to be charged. In adding the polymer scale preventive agent, care should be taken so that the quality of the produced polymer including the fish eyes, the bulk specific gravity, and the particle size distribution may not be influenced.

EXAMPLES

The working examples of the present invention and comparative examples will now be described below. In each table below, experiments marked with * are comparative examples and the other experiments are working examples of the present invention.

Example 1

(Experiment Nos. 101 to 108)

Using a stainless steel polymerization vessel having an internal volume of 2,000 liters and an agitator, polymerization was carried out as follows:

In each experiment, the anthraquinone dye (A), the reducing agent (B), the pH adjustor, and the solvent shown in Table 1 were used so that the conditions (the concentration of the component (A), the concentration of the component (B), the pH, and the solvent composition) shown in Table 1 might be observed, thereby preparing a polymer scale preventive agent. After the polymer scale preventive agent was applied to the inner wall of the polymerization vessel, the agitating shaft, the agitating blades, and other parts where a monomer would come in contact during the polymerization and was heated for 15 min at 50° C. to be dried to form a coating film, the inside of the polymerization vessel was washed with water.

Thereafter, in each experiment, into the polymerization vessel wherein the coating film was formed in the above manner, were charged 800 kg of water, 400 kg of vinyl chloride, 500 g of a partially saponified polyvinyl alcohol, 50 g of hydroxypropyl methyl cellulose, and 140 g of 3,5,5-trimethylhexanoyl peroxide, and the polymerization was carried out at 66° C. for 6 hours with stirring. After the completion of the polymerization, the produced polymer and unreacted monomer were recovered, and the inside of the polymerization vessel was washed with water to remove the residual resin. A batch of operations from the formation of the coating film through the polymerization to the washing of the inner wall of the polymerization vessel with water as carried out above was repeated ten times. After the completion of the ten batches of the operations, the amount of polymer scale deposited on the liquid phase part in the polymerization vessel and the amount of polymer scale deposited near the interface between the gas phase part and the liquid phase part were measured in each experiment by the method shown below. The results are shown in Table 2.

Measurement of the Amount of Deposited Polymer Scale

Scale deposited on an area of 10×10 cm at a given part of the inner wall of the polymerization vessel was scraped off with a spatula and was weighed on a balance. The weighed value was multiplied by 100 to find the amount of the deposited polymer scale per square meter.

The number of fish eyes per 100 $cm^2$ of a sheet molded from the polymer obtained in each experiment was measured by the method shown below. The results are shown in Table 2.

Measurement of Fish Eyes

After a mixture prepared by blending 100 parts by weight of the obtained polymer, 50 parts by weight of dioctyl phthalate (DOP), 1 part by weight of dibutyl tin dilaurate, 1 part by weight of cetyl alcohol, 0.25 part by weight of titanium oxide, and 0.05 part by weight of carbon black was kneaded with 6-inch rolls at 150° C. for 7 min, it was molded into a sheet having a thickness of 0.2 mm, and the number of fish eyes in the obtained sheet per 100 $cm^2$ was investigated by optical transmission.

TABLE 1

| | Polymer scale preventive agent | | | | | | |
|---|---|---|---|---|---|---|---|
| | Anthraquinone dye (A) | | Reducing agent (B) | | pH adjustor | | |
| Expt. No. | Anthraquinone dye | Concn. (wt. %) | Reducing agent | Concn. (wt. %) | pH adjustor | pH | Solvent (weight ratio) |
| 101 | anthraquinone carbazole | 0.3 | sodium hydrosulfite | 0.05 | NaOH | 9.5 | water:methanol (80:20) |
| 102* | — | — | sodium hydrosulfite | 0.05 | NaOH | 9.5 | water:methanol (80:20) |
| 103* | anthraquinone carbazole | 0.3 | — | — | NaOH | 9.5 | water:methanol (80:20) |
| 104 | C.I. Vat Red 13 | 0.3 | Rongalit | 0.1 | KOH | 11.0 | water:methanol (90:10) |
| 105 | C.I. Vat Orange 13 | 0.5 | sodium sulfite | 0.05 | $Na_2CO_3$ | 10.0 | water:methanol (95:5) |
| 106 | C.I. Vat Blue 22 | 0.5 | sodium hydrosulfite | 0.05 | $NH_4OH$ | 10.0 | water:methanol (50:50) |
| 107 | C.I. Vat Green 3 | 0.3 | Rongalit | 0.1 | triethanolamine | 10.0 | water:methanol (70:30) |
| 108 | C.I. Vat Blue 30 | 0.3 | Rongalit | 0.1 | monoethanolamine | 12.0 | water:methanol (70:30) |

TABLE 2

| | Results after 10 batches of polymerization | | |
| --- | --- | --- | --- |
| | Amount of deposited polymer scale (g/m²) | | |
| Expt. No. | Liquid phase part | Near the interface of liquid phase part/gas phase part | Fish eyes (number) |
| 101 | 0 | 15 | 1 |
| 102* | 160 | 1,700 | 45 |
| 103* | 38 | 390 | 30 |
| 104 | 0 | 16 | 1 |
| 105 | 0 | 18 | 1 |
| 106 | 0 | 15 | 1 |
| 107 | 0 | 18 | 1 |
| 108 | 0 | 21 | 1 |

TABLE 3

| | Polymer scale preventive agent | | | | | | |
| --- | --- | --- | --- | --- | --- | --- | --- |
| | Anthraquinone dye (A) | | Reducing agent (B) | | pH adjustor | | |
| Expt. No. | Anthra- quinone dye | Concn. (wt. %) | Reducing agent | Concn. (wt. %) | pH adjustor | pH | Solvent (weight ratio) |
| 201 | C.I. Vat Brown 1 | 0.3 | sodium hydrosulfite | 0.05 | NaOH | 10.0 | water:methanol (90:10) |
| 202* | — | — | sodium hydrosulfite | 0.05 | NaOH | 10.0 | water:methanol (90:10) |
| 203* | C.I. Vat Brown 1 | 0.3 | — | — | NaOH | 10.0 | water:methanol (90:10) |
| 204 | 1,2-anthra- quinone- acridone | 0.5 | Rongalit | 0.1 | trieth- anolamine | 9.0 | water:methanol (90:10) |
| 205 | C.I. Vat Blue 33 | 0.5 | Rongalit | 0.02 | Na₂CO₃ | 11.0 | water:methanol (70:30) |
| 206 | C.I. Vat Yellow 28 | 0.3 | sodium thiosulfate | 0.2 | LiOH | 12.0 | water:methanol (70:30) |
| 207 | C.I. Vat Brown 1 | 0.3 | Rongalit | 0.05 | KOH | 10.0 | water:methanol (70:30) |
| 208 | C.I. Vat Orange 11 | 0.8 | Rongalit | 0.05 | ethylene- diamine | 10.0 | water:methanol (70:30) |
| 209* | C.I. Vat Brown 1 | 0.3 | — | — | — | 5.0 | water:methanol (70:30) |

Example 2

(Experiment Nos. 201 to 209)

Using a stainless steel polymerization vessel having an internal volume of 20 liters and an agitator, polymerization was carried out as follows:

In each experiment, the anthraquinone dye (A), the reducing agent (B), the pH adjustor, and the solvent shown in Table 3 were used so that the conditions (the concentration of the component (A), the concentration of the component (B), the pH, and the solvent composition) shown in Table 3 might be observed, thereby preparing a polymer scale preventive agent. After the polymer scale preventive agent was applied to the inner wall of the polymerization vessel, the agitating shaft, the agitating blades, and other parts where a monomer would come in contact during the polymerization and was heated for 15 min at 50° C. to be dried to form a coating film, the inside of the polymerization vessel was washed with water.

Then, in each experiment, into the polymerization vessel wherein the coating film was formed in the above manner, were charged 9 kg of water, 225 g of sodium dodecyl benzene sulfonate, 12 g of t-dodecyl mercaptan, and 13 g of potassium peroxodisulfate were charged, and after the atmosphere of the inside was replaced with nitrogen gas, 1.3 kg of styrene and 3.8 kg of butadiene were charged, and the polymerization was carried out at 50° C. for 20 hours. After the completion of the polymerization, the produced polymer and unreacted monomer were recovered, and the inside of the polymerization vessel was washed with water to remove the residual resin.

A batch of the operations from the formation of the coating film through the polymerization to the washing of the inner wall of the polymerization vessel with water as carried out above was repeated three times. After the completion of the three batches of operations, the amount of polymer scale deposited on the liquid phase part in the polymerization vessel and the amount of polymer scale deposited near the interface between the gas phase part and the liquid phase part were measured in each experiment in the same way as in Example 1. The results are shown in Table 4.

TABLE 4

| | Results after 3 batches of polymerization | |
| --- | --- | --- |
| | Amount of deposited polymer scale (g/m²) | |
| Expt. No. | Liquid phase part | Near the interface of liquid phase part/gas phase part |
| 201 | 0 | 11 |
| 202* | 110 | 1,200 |
| 203* | 22 | 1,600 |
| 204 | 0 | 15 |
| 205 | 0 | 13 |
| 206 | 0 | 17 |
| 207 | 0 | 14 |
| 208 | 0 | 11 |
| 209* | 630 | 2,500 |

We claim:

1. A polymerization vessel for polymerizing a monomer having an ethylenically unsaturated double bond, which polymerization vessel has, on the inner wall surface, a coating film which is formed by applying and drying an alkaline solution containing (A) at least one anthraquinone dye selected from the group consisting of an acylaminoanthraquinone compound, an anthrimide compound, an indanthrone compound, an anthraquinonethiazole compound, an anthrapyrazolone compound, an anthrapyrimidine compound, a dibenzanthrone compound, an anzanthrone compound, an anthraquinoneacridone compound, a pyranthrone compound, and an anthraquinonecarbazole compound and (B) a reducing agent; in water or a mixed solvent of water and an organic solvent miscible with water, the mixed solvent containing the organic solvent in an amount of 50% by weight or less.

2. A polymerization vessel as claimed in claim 1, wherein, in addition to the inner wall surface of the polymerization vessel, other parts where the monomer comes in contact during the polymerization have the same coating film as described above.

3. A polymerization vessel as claimed in claim 1, wherein parts of a system of recovering unreacted monomer where the unreacted monomer comes in contact have the same coating film as described above.

4. A polymerization vessel as claimed in claim 1, wherein the amount of the coating film after dried is 0.001 to 10 g/m$^2$.

5. A process of producing a polymer by polymerization of a monomer having an ethylenically unsaturated double bond in a polymerization vessel, comprising the step of carrying out said polymerization in a polymerization vessel having, on the inner wall surface, a coating film which is formed by applying and drying an alkaline solution containing (A) at least one anthraquinone dye selected from the group consisting of an acylaminoanthraquinone compound, an anthrimide compound, an indanthrone compound, an anthraquinonethiazole compound, an anthrapyrazolone compound, an anthrapyrimidine compound, a dibenzanthrone compound, an anzanthrone compound, an anthraquinoneacridone compound, a pyranthrone compound, and an anthraquinonecarbazole compound and (B) a reducing agent; in water or a mixed solvent of water and an organic solvent miscible with water, the mixed solvent containing the organic solvent in an amount of 50% by weight or less, whereby polymer scale is prevented from being deposited.

6. A process of producing a polymer as claimed in claim 5, wherein the polymerization is carried out by suspension polymerization, emulsion polymerization, solution polymerization, bulk polymerization, or gas phase polymerization.

7. A process of producing a polymer as claimed in claim 5, wherein said monomer is selected from the group consisting of vinyl esters; vinyl halides, vinylidene halides; acrylic acid and methacrylic acid and their esters and salts; diene monomers; styrene; acrylonitrile; α-metylstyrene; and vinyl ethers.

* * * * *